(12) United States Patent
Machida

(10) Patent No.: US 12,251,842 B2
(45) Date of Patent: Mar. 18, 2025

(54) INFORMATION PROCESSING DEVICE, CONTROL METHOD, AND STORAGE MEDIUM

(71) Applicant: NEC Corporation, Tokyo (JP)

(72) Inventor: Manao Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 501 days.

(21) Appl. No.: 17/625,842

(22) PCT Filed: Jul. 22, 2019

(86) PCT No.: PCT/JP2019/028660
§ 371 (c)(1),
(2) Date: Jan. 10, 2022

(87) PCT Pub. No.: WO2021/014532
PCT Pub. Date: Jan. 28, 2021

(65) Prior Publication Data
US 2022/0258344 A1    Aug. 18, 2022

(51) Int. Cl.
*B25J 9/16* (2006.01)
*G05D 1/00* (2024.01)
*G06F 17/12* (2006.01)

(52) U.S. Cl.
CPC .......... *B25J 9/1661* (2013.01); *G05D 1/0212* (2013.01); *G05D 1/0274* (2013.01); *G06F 17/12* (2013.01)

(58) Field of Classification Search
CPC ...... B25J 9/1661; B25J 9/1666; B25J 9/1676; G06F 17/12; G06N 7/01; G05B 2219/39087; G05D 1/0297
See application file for complete search history.

(56) References Cited

U.S. PATENT DOCUMENTS

| | | | |
|---|---|---|---|
| 2009/0015404 A1* | 1/2009 | Lin | B25J 9/1682 340/540 |
| 2012/0130538 A1* | 5/2012 | Riener | G05B 19/423 700/245 |
| 2018/0171590 A1* | 6/2018 | Kean | E02F 3/434 |

FOREIGN PATENT DOCUMENTS

| | | |
|---|---|---|
| EP | 3467984 A1 | 4/2019 |
| JP | 2009-288930 A | 12/2009 |

(Continued)

OTHER PUBLICATIONS

International Search Report for PCT Application No. PCT/JP2019/028660, mailed on Oct. 8, 2019.

(Continued)

*Primary Examiner* — Basil T. Jos
*Assistant Examiner* — Elizabeth Rose Neleski

(57) ABSTRACT

The information processing device 1A mainly includes an acquisition unit 51A, a sampling unit 54A, an artificial force field calculation unit 55A, and an output unit 56A. The acquisition unit 51A is configured to acquire a task logical expression in which an objective task to be performed by a robot is expressed by a combination of a plurality of atomic tasks. The sampling unit 54A is configured to perform sampling of one potential function from among a plurality of potential functions each of which is synthesized atomic potential functions, the atomic potential functions each corresponding to each of the atomic tasks. The artificial force field calculation unit 55A is configured to calculate, on a basis of the sampled potential function, an approximate artificial force field which approximates an artificial force field yielded when the atomic potential functions are synthesized according to the task logical expression. The output unit 56A is configured to output the approximate artificial force field.

8 Claims, 8 Drawing Sheets

(56) References Cited

FOREIGN PATENT DOCUMENTS

| JP | 2013-242777 A | 12/2013 |
| JP | 2016-159406 A | 9/2016 |
| JP | 2017-216757 A | 12/2017 |

OTHER PUBLICATIONS

N. E. Leonard et al., "Virtual leaders, artificial potentials and coordinated control of groups", Proc. 40th IEEE Conf. Decision and Control, 2001, pp. 2968-2973.

* cited by examiner

INFORMATION PROCESSING DEVICE, CONTROL METHOD, AND STORAGE MEDIUM

This application is a National Stage Entry of PCT/JP2019/028660 filed on Jul. 22, 2019, the contents of all of which are incorporated herein by reference, in their entirety.

TECHNICAL FIELD

The present invention relates to a technical field of an information processing device, a control method, and a storage medium for performing processing related to tasks to be performed by robots.

BACKGROUND ART

One of the path derivation methods for a robot is a technique called the potential method (artificial potential field method). In the potential method, when the robot is controlled to work, the objective function according to the work is designed, and the robot moves in the direction in which the objective function decreases. Patent Literature 1 discloses a robot which generates a route to the target position by generating a virtual attractive potential field for the target position and a virtual repulsive potential field for obstacles and making them overlap. In addition, Patent Literature 2 discloses an approach for generating a pseudo probability distribution by a method belonging to a MCMC (Markov Chain Monte Carlo) method such as the Metropolis-Hastings method and the Gibbs sampling method. Further, Non-Patent Literature 1 discloses a robot model using the potential method in which the acceleration is used for the control input.

PRIOR ART DOCUMENTS

Patent Literature

Patent Literature 1: JP 2009-288930A
Patent Literature 2: JP 2017-216757A

Non-Patent Literature

Non-Patent Literature 1: N. E. Leonard and E. Fiorelli. Virtual leaders, artificial potentials and coordinated control of groups. Proc. of the 40th IEEE Conf on Decision and Control, pp. 2968-2973, 2001.

SUMMARY OF THE INVENTION

Problem to be Solved by the Invention

In the potential method, it is necessary to calculate the artificial force field corresponding to the gradient of the objective function. On the other hand, when letting robots perform a task with complicated work, there is such an issue that the amount of calculation of the artificial force field becomes enormous and that the real-time process cannot be ensured.

In view of the above-described issue, it is therefore an example object of the present disclosure to provide an information processing device, a control method and a storage medium capable of suitably executing the calculation of the artificial force field when using the potential method.

Means for Solving the Problem

In one mode of the information processing device, there is provided an information processing device including: an acquisition unit configured to acquire a task logical expression in which an objective task to be performed by a robot is expressed by a combination of a plurality of tasks; a sampling unit configured to perform sampling of one potential function from among a plurality of potential functions each of which is synthesized atomic potential functions, the atomic potential functions each corresponding to each of the tasks; an artificial force field calculation unit configured to calculate, on a basis of the one potential function, an approximate artificial force field which approximates an artificial force field yielded when the atomic potential functions are synthesized according to the task logical expression; and an output unit configured to output the approximate artificial force field.

In one mode of the control method, there is provided a control method executed by an information processing device, the control method including: acquiring a task logical expression in which an objective task to be performed by a robot is expressed by a combination of a plurality of tasks; performing sampling of one potential function from among a plurality of potential functions each of which is synthesized atomic potential functions, the atomic potential functions each corresponding to each of the tasks; calculating, on a basis of the one potential function, an approximate artificial force field which approximates an artificial force field yielded when the atomic potential functions are synthesized according to the task logical expression; and outputting the approximate artificial force field.

In one mode of the storage medium, there is provided a storage medium storing a program executed by a computer, the program causing the computer to function as: an acquisition unit configured to acquire a task logical expression in which an objective task to be performed by a robot is expressed by a combination of a plurality of tasks; a sampling unit configured to perform sampling of one potential function from among a plurality of potential functions each of which is synthesized atomic potential functions, the atomic potential functions each corresponding to each of the tasks; an artificial force field calculation unit configured to calculate, on a basis of the one potential function, an approximate artificial force field which approximates an artificial force field yielded when the atomic potential functions are synthesized according to the task logical expression; and an output unit configured to output the approximate artificial force field.

Effect of the Invention

An example advantage according to the present invention is to suitably reduce the amount of calculation necessary for calculating the artificial force field when using the potential method.

EXAMPLE EMBODIMENTS

Hereinafter, example embodiments of an information processing device, a control method, and a storage medium will be described with reference to the drawings.

First Example Embodiment

[System Configuration]

Figure 1:
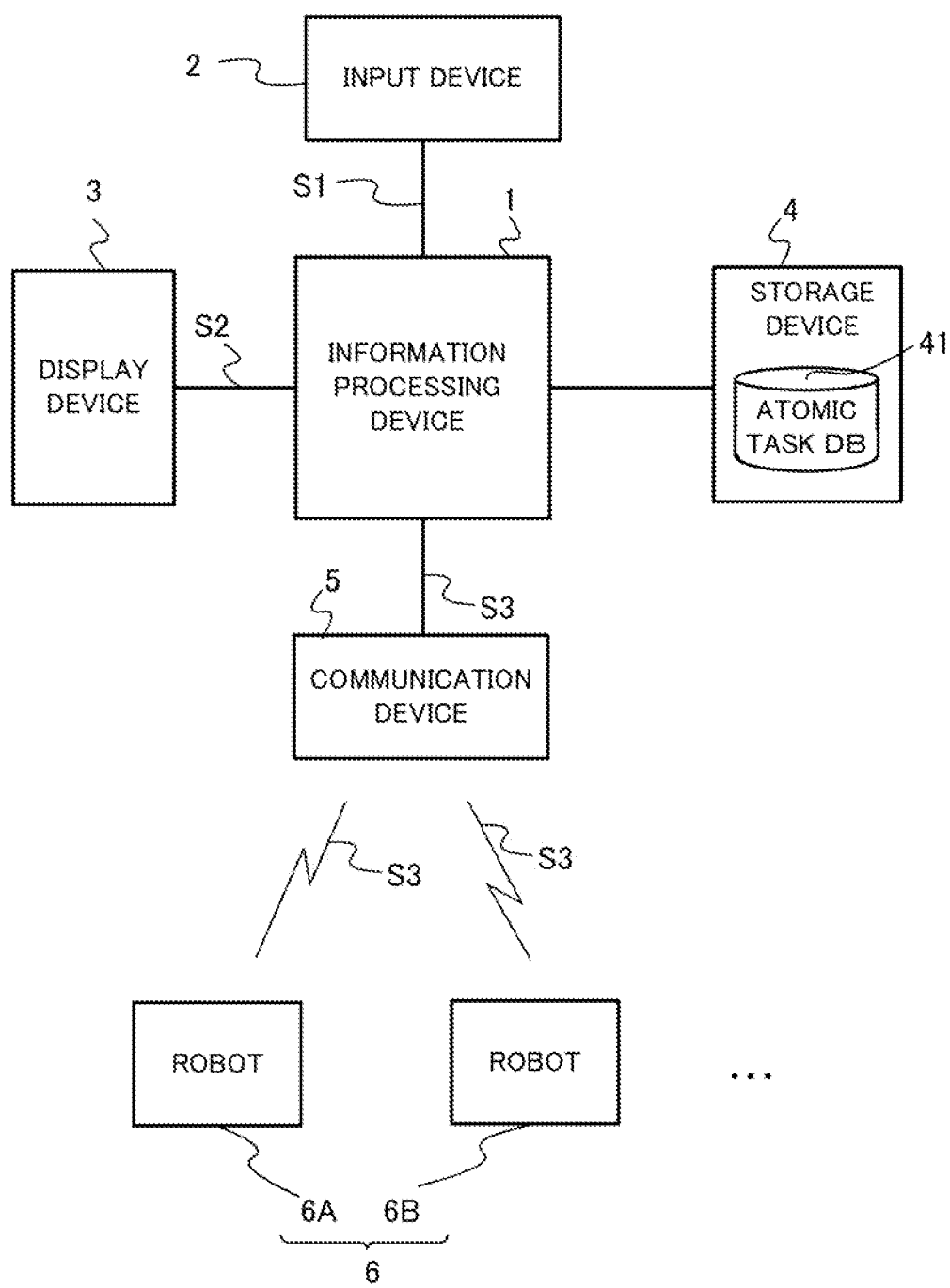
FIG. 1 illustrates the configuration of the robot control system.

FIG. 1 shows a configuration of a robot control system 100 according to the first example embodiment. The robot control system 100 mainly includes an information processing device 1, an input device 2, a display device 3, a storage device 4, a communication device 5, and a plurality of robots 6 (6A, 6B, . . . ). The storage device 4 includes an atomic task DB 41.

The information processing device 1 sets an objective function as a potential function in the potential method (Artificial Potential Field Approach), and determines an artificial force field corresponding to the gradient of the objective function and uses it as a control input to each of the robots 6. In this case, when a logical expression (also referred to as "task logical expression") is given through a user input, the information processing device 1 converts the task logical expression into an objective function and calculates the artificial force field from the objective function, wherein the task logical expression expresses a task to be performed by the robots 6 by a combination of simple tasks. Hereafter, a task to be performed by the robots 6 is referred to as "objective task", and a simple task when the target task is expressed by a combination of simple tasks is referred to as "atomic task". For example, the objective task is a complex task that causes multiple robots 6 to work jointly and the atomic task is a simple task for just one robot 6.

Generally, when the objective task is complicated, it becomes difficult to calculate the artificial force field corresponding to the gradient of the objective function. Therefore, the information processing device 1 according to the present example embodiment, as will be described later, approximately calculate the artificial force field by adding a probabilistic operation based on a randomized control. Thereby, the information processing device 1 reduces the amount of calculation required for calculating the artificial force field and ensures real-time performance for the control of the robots 6.

The information processing device 1 is electrically connected to the input device 2, the display device 3, the storage device 4 and the communication device 5. For example, the information processing device 1 receives the input signal "S1" based on the user's operation and the like from the input device 2. Here, when the input signal S1 includes information specifying the task logical expression, the information processing device 1 refers to the atomic task DB 41 stored in the storage device 4 and converts the task logical expression specified by the input signal S1 into an objective function. Then, the information processing device 1 determines a control input for controlling the respective robots 6 from the objective function. Further, when the input signal S1 includes information relating to updating of the atomic task DB 41, the information processing device 1 updates the atomic task DB 41 stored in the storage device 4 based on the input signal S1. The information processing device 1 also transmits, to the display device 3, a display signal "S2" for displaying information relating to the task to be executed by the robots 6. The information processing device 1 also transmits a control signal "S3" relating to the control of each of the robots 6 via the communication device 5 to the each of the robots 6. For example, the information processing device 1 transmits, to each of the robots 6 through the communication device 5, a control signal S3 including the control input for specifying the operation of the each of the robots 6.

The input device 2 is an interface that receives the input of the user, and the examples of the input device 2 include a touch panel, a button, a keyboard, a voice input device. The input device 2 supplies the input signal S1 generated based on the input by the user to the information processing device 1. It is noted that the input device 2 may be integrated with the information processing device 1 as one device in such a state that it is incorporated in the information processing device 1.

The display device 3 displays information based on the display signal S2 supplied from the information processing device 1, and the examples of the display device 3 include a display and a projector. For example, on the basis of the display signal S2, the display device 3 displays an input view (also referred to as a "task input view") in which an objective task is to be specified in the form of a task logical expression. The display device 3 may be configured to be integrated with the information processing device 1 as one device.

The storage device 4 is a memory configured to store the atomic task DB 41 and the like. The atomic task DB 41 is a database on atomic tasks the combination of which is used as an objective task to be performed by the robots 6. The data structure of the atomic task DB 41 will be described later. The storage device 4 may be an external storage device such as a hard disk connected to or built in to the information processing device 1, or may be a storage medium such as a flash memory. The storage device 4 may be a server device that performs data communication with the information processing device 1. In this case, the storage device 4 may be configured by a plurality of server devices.

The communication device 5 is a network adapter or the like, and communicates with the information processing device 1 and the robots 6. The communication between the communication device 5 and each of the robots 6 may be a wireless communication or a wired communication. It is noted that the communication device 5 may be integrated with the information processing device 1 as one device in such a state that it is incorporated in the information processing device 1.

The robots 6 (6A, 6B, . . . ) perform operations based on the control signal S3 transmitted from the communication device 5. In the present example embodiment, each of the robots 6 operates based on the control input specified by the control signal S3.

[Hardware Configuration of Information Processing Device]

Figure 2:
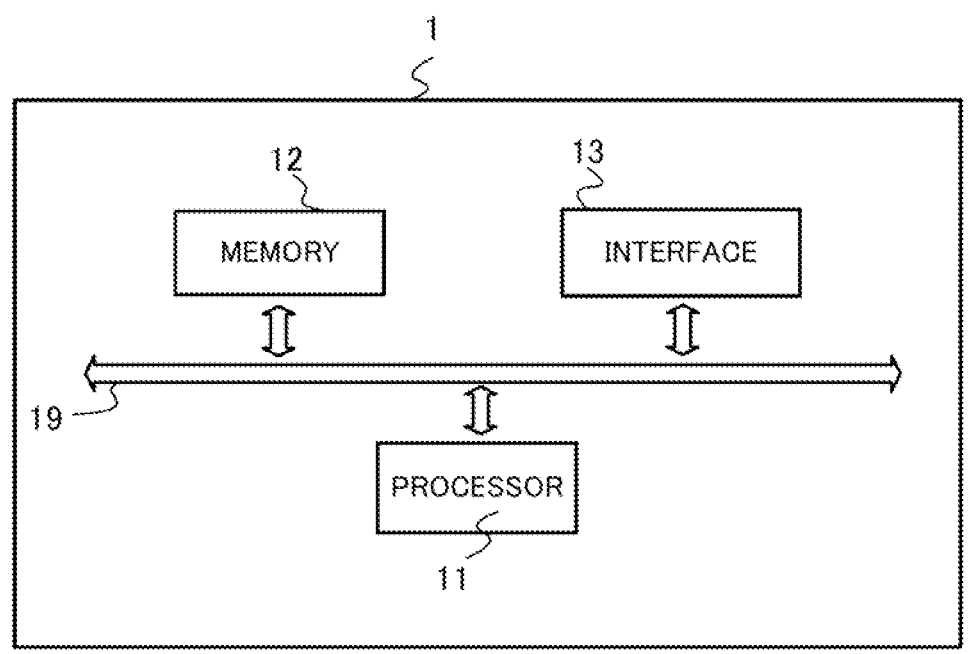
FIG. 2 illustrates the hardware configuration of an information processing device.

FIG. 2 shows the hardware configuration of the information processing device 1. The information processing device 1 includes a processor 11, a memory 12, and an interface 13 as hardware. The processor 11, the memory 12, and the interface 13 are connected to one another via a data bus 19.

The processor 11 executes a predetermined process by executing a program stored in the memory 12. The processor 11 is a processor such as a CPU (Central Processing Unit) and a GPU (Graphics Processing Unit).

The memory 12 is configured by various memories such as a RAM (Random Access Memory) and a ROM (Read Only Memory). In addition, a program for executing a predetermined process by the information processing device 1 is stored in the memory 12. The memory 12 is used as a work memory and temporarily stores information acquired from the storage device 4. The memory 12 may function as a storage device 4. In the same way, the storage device 4 may function as a memory 12 of the information processing device 1. The program executed by the information processing device 1 may be stored in a storage medium other than the memory 12.

The interface 13 is an interface for electrically connecting the information processing device 1 and other devices. For example, the interface 13 includes an interface for connecting the information processing device 1 and the input device 2, an interface for connecting the information processing device 1 and the display device 3, an interface for connecting the information processing device 1 and the storage device 4, and an interface for connecting the information processing device 1 and the communication device 5. The interface for connecting the information processing device 1 and the storage device 4 may be a communication interface for wired or wireless transmission and reception of data to and from the storage device 4 under the control of the processor 11. In this case, the interface 13 may perform data communication with the storage device 4 through the communication device 5. In another example, the information processing device 1 and the storage device 4 may be connected by a cable or the like. In this case, the interface 13 includes an interface which confirms to USB or SATA (Serial AT Attachment) or the like for exchanging data with the storage device 4. The interface 13 may be an interface for the information processing device 1 to transmit and receive signals to and from one or more internal sensors and external sensors. In this case, the external sensors may be a camera and/or a range measuring sensor for acquiring the position information regarding each of the robots 6 (including the position information regarding an object when the object is a tracking target).

The hardware configuration of the information processing device 1 is not limited to the configuration shown in FIG. 2. For example, the information processing device 1 may include at least one of an input device 2, a display device 3, a storage device 4, and a communication device 5. Further, a sound output device such as a speaker may be connected or built in to the information processing device 1. In these cases, the information processing device 1 may be a tablet type terminal or the like in which the input function and the output function are integrated with the main body.

[Atomic Task DB]

Next, the data structure of the atomic task DB 41 will be described.

Figure 3A:
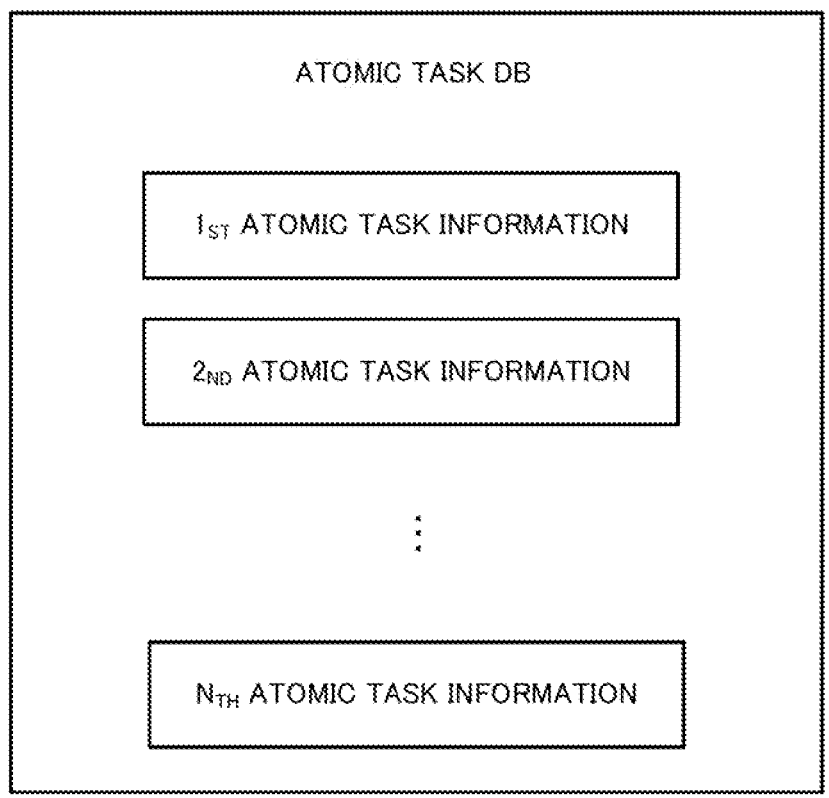
FIG. 3A illustrates an example of the data structure of an atomic task DB

FIG. 3A shows an exemplary data structure of the atomic task DB 41. As shown in FIG. 3A, the atomic task DB 41 has N (N is an integer of 2 or more) pieces of atomic task information (the first atomic task information to the Nth atomic task information) corresponding to N atomic tasks, respectively. The atomic task information is information regarding atomic tasks, and the detail thereof will be described later. The atomic task information included in the atomic task DB 41 may be stored in the storage device 4 in advance as an initial setting, or may be generated by the information processing device 1 in response to an input signal S1 based on a user input to the input device 2 and stored in the storage device 4.

Figure 3B:
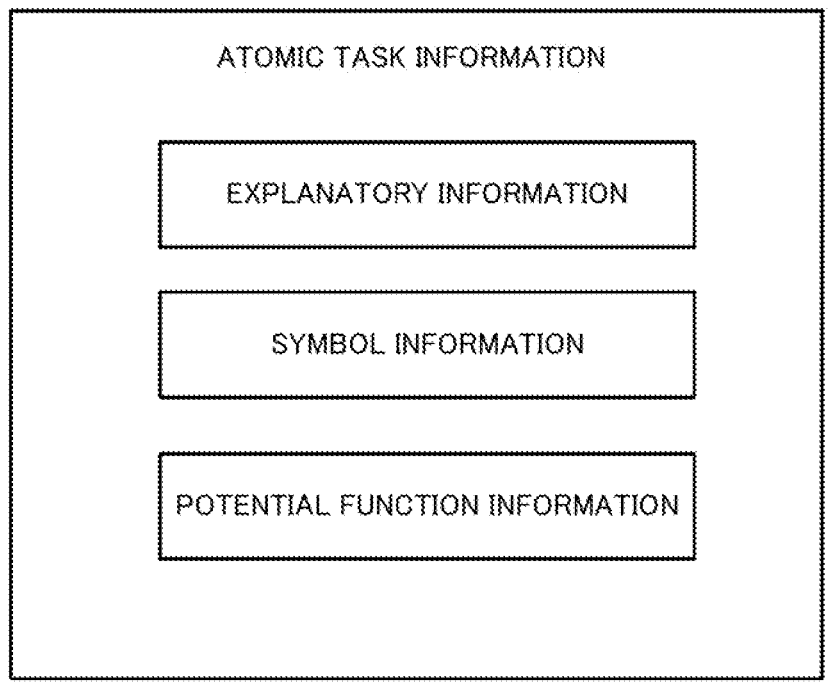
FIG. 3B illustrates an example of the data structure of atomic task information.

FIG. 3B shows an example of the data structure of the atomic task information (first atomic task information to $N_{th}$ atomic task information). As shown in FIG. 3B, the atomic task information mainly includes explanatory information, symbol information, and potential function information, respectively.

The explanatory information is text information describing the content of each atomic task. The explanatory information is used to display, on the task input view, descriptive text to describe the contents of available atomic tasks when specifying the task logical expression.

The symbol information indicates the symbol of each atomic task. The above symbol denotes the proposition (also referred to as "atomic proposition") of each atomic task to be used in the task logical expression specified by the user. In other words, symbols indicated by the symbol information are symbols indicating the propositions of the atomic tasks that can be used when the user specifies on the task input view the task logical expression that is the combination of the atomic tasks. Each atomic proposition is a proposition which becomes "1" when the corresponding atomic task is achieved and which becomes "0" when the corresponding atomic task is not achieved.

The potential function information indicates a potential function (referred to as "atomic potential function") corresponding to each atomic task. The atomic potential function is a function that is set to "0" when a corresponding atomic task is accomplished, and set to a value greater than 0 otherwise.

As described above, each atomic task information (the first atomic task information to the $N_{th}$ atomic task information) registered in the atomic task DB 41 becomes information in which the description of each atomic task and the symbol of the atomic proposition indicative of the each atomic task are associated with the atomic potential function corresponding to the atomic proposition.

[Functional Block]

Figure 4:
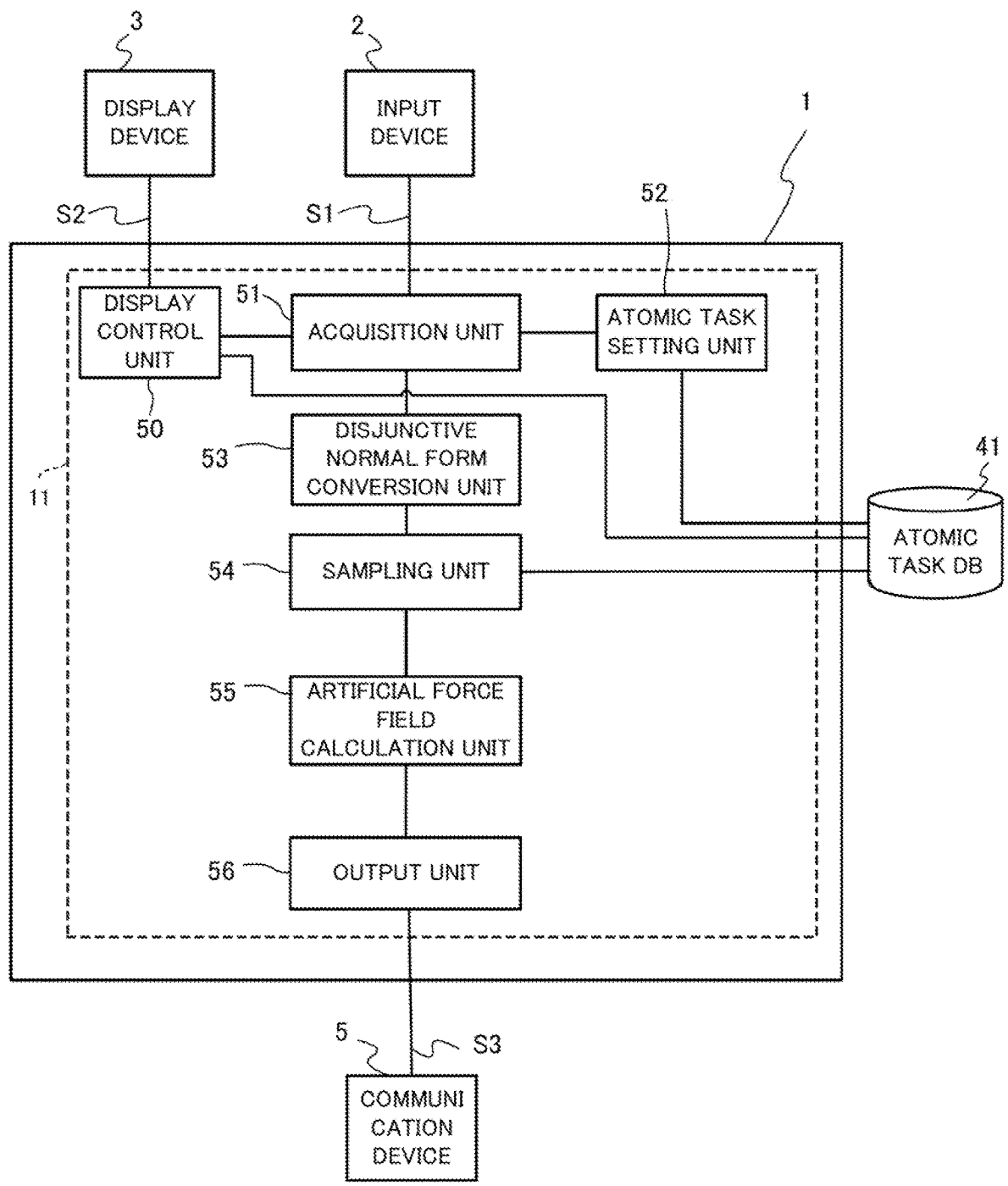
FIG. 4 illustrates an example of a functional block of the information processing device.

FIG. 4 is an example of a functional block of the information processing device 1. The processor 11 of the information processing device 1 functionally includes a display control unit 50, an acquisition unit 51, an atomic task setting unit 52, a disjunctive normal form conversion unit 53, a sampling unit 54, an artificial force field calculation unit 55, and an output unit 56.

The display control unit 50 refers to the atomic task DB 41 and generates a display signal S2 for displaying the task input view. Then, the display control unit 50 supplies the generated display signal S2 to the display device 3. Further, the display control unit 50 generates a display signal S2 for displaying an input view which receives an input relating to the updating of the atomic task DB 41, and supplies the display signal S2 to the display device 3.

When the task logical expression is inputted on the task input view, the acquisition unit 51 receives an input signal S1 indicating the task logical expression from the input device 2. Then, the acquisition unit 51 supplies the input signal S1 indicating the task logical expression to the disjunctive normal form conversion unit 53. Further, when the input signal S1 relating to the updating of the atomic task DB 41 is received from the input device 2, the acquisition unit 51 supplies the input signal S1 to the atomic task setting unit 52.

The atomic task setting unit 52 updates the atomic task DB 41 when receiving the input signal S1 relating to the update of the atomic task DB 41 from the acquisition unit 51. In this case, for example, the input signal S1 is information indicating addition, change, or deletion of the atomic task information to be recorded in the atomic task DB 41, and the atomic task setting section 52 performs addition, change, or deletion of the atomic task information to be recorded in the atomic task DB 41 based on the input signal S1. The input signal S1 indicating the addition of the atomic task information includes information on the explanatory text of an atomic task, the symbol indicating the atomic proposition thereof, and the atomic potential function thereof, respectively, and the atomic task setting unit 52 generates the atomic task information having the data structure shown in FIG. 3B based on the above-mentioned information. In this case, the atomic task setting unit 52 registers the generated atomic task information in the atomic task DB 41.

The disjunctive normal form conversion unit 53 converts the task logical expression to the disjunctive normal form when the input signal S1 indicative of the task logical expression is supplied from the acquisition unit 51. Thereby, as will be described later, the disjunctive normal form conversion unit 53 can express the artificial force field derived from the task logical expression by a generalized expression. The artificial force field in this case is expressed by a polynomial with "L" terms. The number L of the terms is exponentially increased as the objective function is complicated, and it is difficult to directly calculate the artificial force field for the complicated objective function in real time. The disjunctive normal form conversion unit 53 supplies the information on the task logical expression converted into the disjunctive normal form to the sampling unit 54.

The sampling unit 54 performs sampling of the potential function corresponding to one term included in the polynomial of the artificial force field which is derived from the task logical expression in the disjunctive normal form generated by the disjunctive normal form conversion unit 53. The sampled potential function (also referred to as "sample potential function") is used to calculate an approximate artificial force field.

The artificial force field calculation unit 55 performs an approximate calculation of the artificial force field directly derived from the task logical expression on the basis of the sample potential function determined by the sampling unit 54. Hereafter, a pseudo artificial force field approximately calculated from the task logical expression is also referred to as an "approximate artificial force field". The description in detail of the processing executed by the sampling unit 54 and the artificial force field calculation unit 55 will be given in the section [Calculation of Approximate Artificial Force Field].

It is noted that the artificial force field calculation unit 55 acquires the position information regarding each of the robots 6 necessary for calculating the approximate artificial force field. In this case, for example, the information processing device 1 is connected to one or more external sensors such as a camera, and the artificial force field calculation unit 55 acquires the position information regarding each of the robots 6 based on the output of the external sensors. In another example, the information processing device 1 receives the position information from each of the robots 6 via the communication device 5. Further, for example, in the case of such an objective task that the multiple robots 6 captures (tracks) a plurality of objects to capture, the artificial force field calculation unit 55 acquires the position information regarding the objects in addition to the position information regarding each of the robots 6.

The output unit 56 transmits a control signal S3 including a control input indicative of the approximate artificial force field calculated by the artificial force field calculation unit 55 to each of the robots 6 via the communication device 5.

[Conversion of Task Logical Expression]

Next, the conversion from the task logical expression to the objective function and the conversion from the objective function to the artificial force field will be described.

(1) Explanation of Assumptions

First, assumptions regarding the conversion of task logical expressions are described.

When converting a task logical expression to an objective function, the information processing device 1 performs a process (referred to as "first conversion process") of converting atomic propositions in a task logical expression into atomic potential functions, and a process (referred to as "second conversion process") of converting logical connectors in the task logical expression into arithmetic operators applicable to atomic potential functions.

First, a description will be given of the first conversion process. In the first conversion process, the information processing device 1 extracts atomic task information including symbol information indicative of symbols of atomic propositions in the task logical expression from the atomic task DB 41. Then, the information processing device 1 replaces the atomic propositions in the task logical expression by the atomic potential functions indicated by the potential function information included in the extracted atomic task information.

Next, a description will be given of the second conversion process. In the second conversion process, the information processing device 1 converts the logical connectors in the task logical expression into the above-described arithmetic operators by referring to the correspondence information in which each logical connector and the corresponding arithmetic operator to be applied to potential functions are previously associated. The correspondence information is previously stored in the memory 12 or the storage device 4.

For example, the information processing device 1 converts the logical connector "∧" indicating the logical AND (logical conjunction) into an addition operator. Further, the information processing device 1 converts the logical connector "∨" indicating the logical OR (logical disjunction) into a multiplication operator.

For example, it is hereinafter assumed that the atomic proposition for atomic task "A" is denoted by "$\varphi_A$" and its atomic potential function is denoted by "$P_A(x)$", and that the atomic proposition for atomic task "B" is denoted by "$\varphi_B$" and its atomic potential function is denoted by "$P_B(x)$". Here, "x" indicates a variable vector indicating the position and the like of each of the robots 6.

In this case, the information processing device 1 converts the logical expression "$\varphi_A \wedge \varphi_B$" that means "achieving the atomic task A and the atomic task B" according to the following expression (1).

$$\varphi_A \wedge \varphi_B \Rightarrow P_A(x) + P_B(x) \tag{1}$$

According to the expression (1), when both the atomic task A and the atomic task B are achieved (i.e., when the logical expression on the left side is true), the right side of the combination of the atomic potential function $P_A(x)$ and the atomic potential function $P_B(x)$ is 0, which is the smallest value.

The information processing device 1 converts the task logical expression "$\varphi_A \vee \varphi_B$" that means "achieving the atomic task A or the atomic task B" according to the following expression (2).

$$\varphi_A \vee \varphi_B \Rightarrow P_A(x) \cdot P_B(x) \quad (2)$$

According to the expression (2), when either the atomic task A or the atomic task B is achieved (i.e., when the logical expression on the left side is true), the right side of the combination of the atomic potential function $P_A(x)$ and the atomic potential function $P_B(x)$ is 0, which is the smallest value.

Further, the information processing device 1 may determine the objective function in consideration of the priority set for each atomic task.

For example, it is assumed that the degree of the priority of the task A corresponding to the atomic proposition "$\varphi_A$" is "$\alpha$" and the degree of the priority of the task B corresponding to the atomic proposition "$\varphi_B$" is "$\beta$", respectively. The degrees of the priorities $\alpha$ and $\beta$ shall be equal to or greater than 0, respectively, and the larger the degree thereof, the higher the priority becomes. In this case, instead of using the expression (1), the potential function synthesizing unit 53 converts the logical expression "$\varphi_A \wedge \varphi_B$" related to the logical AND based on the following expression (3).

$$\varphi_A \wedge \varphi_B \Rightarrow \alpha \cdot P_A(x) + \beta \cdot P_B(x) \quad (3)$$

In this way, the information processing device 1 multiplies the atomic potential function by degree of the priority of the corresponding atomic task when the logical AND is converted into an addition operator. Thus, the information processing device 1 performs weighting for each atomic potential function in accordance with the priority thereby to promote the early execution of the atomic tasks having higher priorities.

Further, instead of the expression (2), the information processing device 1 converts the logical expression "$\varphi_A \vee \varphi_B$" regarding the logical OR based on the following expression (4).

$$\varphi_A \vee \varphi_B \Rightarrow P_A^\alpha(x) \cdot P_B^\beta(x) \quad (4)$$

Thus, the information processing device 1 sets the priority of the atomic task to the exponent of the corresponding atomic potential function when converting the logical OR into the multiplication operator. Accordingly, the information processing device 1 performs weighting for each atomic potential function according to the priority thereby to promote the early execution of the atomic tasks having higher priorities.

Further, in the second conversion process, instead of simply replacing the logical AND with the addition operator as shown in the expression (1), the information processing device 1 may associate the logical AND with the average value of the tasks.

For example, the information processing device 1 may convert "$\varphi_A \wedge \varphi_B \wedge \varphi_C$" that is the logical AND of the proposition "$\varphi_A$" corresponding to the atomic task A, the proposition "$\varphi_B$" corresponding to the atomic task B, and the proposition "$\varphi_C$" corresponding to the atomic task C according to the following expression (5).

$$\varphi_A \wedge \varphi_B \wedge \varphi_C \Rightarrow \tfrac{1}{3}(P_A(x)+P_B(x)+P_C(x)) \quad (5)$$

In this case, the information processing device 1 regards the logical AND as the average of the atomic tasks and calculates the average value of the corresponding atomic potential functions. The information processing device 1 calculates the average value of the corresponding atomic potential functions for the logical AND of the two or four or more atomic propositions in the same way.

Similarly, the information processing device 1 may convert "$\varphi_A \vee \varphi_B \vee \varphi_C$" including the logical OR according to the following expression (6).

$$\varphi_A \vee \varphi_B \vee \varphi_C \Rightarrow (P_A(x) \cdot P_B(x) \cdot P_C(x))^{1/3} \quad (6)$$

In this case, the information processing device 1 regards the logical OR as the geometric average of the atomic tasks and calculates the geometric average of the corresponding atomic potential functions. The information processing device 1 calculates the geometric average of the corresponding atomic potential functions for the logical OR of the two or four or more atomic propositions in the same way.

Next, a description will be given of the relationship between the objective function and the control input.

For example, a description will be given of the case where each of the robots 6 can freely determine the own velocity through the control input. In this case, when the control input for the robot A is set to "$u_a$" and the control input for the robot B is set to "$u_b$", the derivative (i.e., movement velocity) of the position of the robot A and the robot B is determined by the control inputs $u_a$ and $u_b$ as shown in the following expressions.

$$\dot{p}_a = u_a$$

$$\dot{p}_b = u_b$$

Here, each of the control inputs $u_a$ and $u_b$ is set to the partial derivative of the objective function (i.e., the artificial force field corresponding to the gradient of the potential function). Specifically, when the objective function is denoted by "$P(p_a, p_b)$", the control inputs $u_a$ and $u_b$ are determined based on the following expressions, respectively.

$$u_a = -\frac{\partial P}{\partial p_a}(p_a, p_b)$$

$$u_b = -\frac{\partial P}{\partial p_b}(p_a, p_b)$$

In this way, the robot A and the robot B can be moved so that the objective function $P(p_a, p_b)$ is reduced, and the objective task specified by the task logical expression can be preferably executed.

(2) Generalization of Artificial Force Field

Next, the generalization of the artificial force field derived from the task logical expression will be described.

Here, as an example, it is assumed the objective task "n robots 6 capture n mobile objects" is given. In this case, the number (i.e., the number of permutations of the robots 6 in the case of fixing the arrangement of the mobile objects) of possible combinations of the robot 6 and the mobile object is n!. Hereafter, the index of the above permutation is represented by "i" (i=1, . . . , n!). In this case, the objective task is decomposed into n! tasks for respective fixed permutations. Here, each of n! tasks is further decomposed into tasks (i.e., n tasks) for each of the robots 6, and each decomposed task is regarded as an atomic task. Hereafter, the proposition of each of the decomposed n atomic tasks is denoted by "$\varphi_{ij}$" (j=1, . . . , n).

In this case, the task logical expression supplied from the acquisition unit 51 is expressed by the disjunctive normal form as shown in the following expression (7).

$$\bigvee_{i}^{n!} \bigwedge_{j}^{n} \varphi_{ij} \qquad (7)$$

In general, any logical expression can be expressed by a disjunctive normal form. Thus, the disjunctive normal form conversion unit 53 can convert any task logical expression representing a task other than the above-described objective task into a disjunctive normal form in the same manner as in the expression (7).

Then, assuming that the atomic potential function corresponding to the proposition $\varphi_{ij}$ of an atomic task is denoted by "$P_{ij}(x)$", the objective function (i.e., the synthesized atomic potential functions) corresponding to the expression (7) is expressed by the following expression (8) based on the conversion rules of the logical connectors shown in the expressions (1) and (2).

$$\prod_{i}^{n!} \sum_{j}^{n} P_{ij}(x) \qquad (8)$$

Here, "x" denotes a variable vector indicating the position of each of the robots 6. Hereafter, as shown in the following expression (9), the sub-expression that is the target of the direct product in the expression (8) is replaced by the potential function $P_i(x)$ as follows.

$$P_i(x) = \sum_{j}^{n} P_{ij}(x) \qquad (9)$$

In this case, the artificial force field corresponding to the slope of the potential function shown in the expression (8) is expressed by the expression (10) below.

$$\sum_{i} \frac{1}{P_i(x)} \frac{\partial P_i}{\partial x}(x) \prod_{i} P_i(x) \qquad (10)$$

It is noted that, for example, the partial derivative is applied for each of the X coordinates and Y coordinates defined on the horizontal plane with respect to the robot 6 subjected to control.

Here, if ignoring a constant multiple that does not have a substantial influence, the expression (10) is converted as shown in the expression (11) below.

$$\sum_{i} \frac{1}{P_i(x)} \frac{\partial P_i}{\partial x}(x) \prod_{i} P_i(x) \Rightarrow \sum_{i} P_i^{-1}(x) \frac{\partial P_i}{\partial x}(x) \qquad (11)$$

As a modification of the expression (8), a description will be given of the objective function shown in the following expression (12) where the exponent of the potential function $P_i(x)$ is set to the constant "$-\delta$" that is, for example, the weighting based on the priority.

$$\sum_{i}^{L} P_i^{-\delta}(x) \qquad (12)$$

In this case, the artificial force field shown in the following expression (13) is derived.

$$-\delta \sum_{i}^{L} P_i^{-\delta-1}(x) \cdot \frac{\partial P_i}{\partial x}(x) \qquad (13)$$

Then, the artificial force field indicated by the expressions (11) and (13) can be uniformly expressed by the following expression (14) using the constant "$\varepsilon$".

$$\sum_{i}^{L} P_i^{-\varepsilon}(x) \cdot \frac{\partial P_i}{\partial x}(x) \qquad (14)$$

As shown in the expression (14), the artificial force field to be calculated by the information processing device 1 can be expressed by a polynomial with L terms represented by the potential functions $P_1(x)$ to $P_L(x)$.

Here, the number L possibly increases exponentially and, in such a case where the number L is a very large number, it becomes difficult to accurately calculate the artificial force field shown in the expression (14). Considering the above, the information processing device 1 calculates an approximate artificial force field which approximates the artificial force field shown in the expression (14) by performing a probabilistic operation.

[Calculation of Approximate Artificial Force Field]

Next, the calculation method of the approximate artificial force field will be described.

First, the sampling unit 54 samples one potential function from among the potential functions $P_i(x)$ ($P_1(x)$ to $P_L(x)$) corresponding to the L terms included in the general expression (14) of the artificial force field. In this case, by applying a sampling method such as MCMC (Markov chain Monte Carlo) method, the sampling unit 54 samples the sample potential function from among the potential functions $P_i(x)$ ($P_1(x)$ to $P_L(x)$) corresponding to the terms included in the expression (14) in accordance with the probability shown in the following expression (15).

$$\left( \sum_{i}^{L} P_i^{-\varepsilon}(x) \right)^{-1} \cdot P_i^{-\varepsilon}(x) \qquad (15)$$

In this case, with a sufficient number of samplings, the expected value of the artificial force field calculated from one potential function (i.e., the sample potential function) sampled according to MCMC is equivalent to the artificial force field shown in the expression (14). Therefore, by performing sampling according to MCMC, the sampling unit 54 can suitably select a sample potential function suitable for calculation of an approximate artificial force field which approximates the artificial force field shown in the expression (14).

The artificial force field calculation unit 55 calculates an approximate artificial force field as a control input based on one potential function (i.e., the sample potential function) sampled by the sampling unit 54. In this case, the artificial force field calculation unit 55 determines the next control input to be the approximate artificial force field based on the sample potential function and the potential function (also referred to as "current potential function") used in the calculation of the immediately preceding (i.e., last outputted) control input. Specific examples in this case (the first example to the fourth example) will be described in order.

In the first example, the artificial force field calculation unit 55 calculates the approximate artificial force field from the sample potential function without using the current potential function. In this case, the artificial force field calculation unit 55 calculates the partial derivative of the sample potential function as the approximate artificial force field.

In the second example, the artificial force field calculation unit 55 compares the sample potential function with the current potential function. If the sample potential function is smaller than the current potential function, the artificial force field calculation unit 55 calculates an approximate artificial force field from the sample potential function. On the other hand, if the sample potential function is equal to or greater than the current potential function, the artificial force field calculation unit 55 uses the approximate artificial force field calculated from the current potential function as the control input. In this way, in the second example, the artificial force field calculation unit 55 uses the sample potential function only when the sample potential function is smaller than the current potential function. This reduces randomness and can be expected to achieve the desired task early.

In the third example, the artificial force field calculation unit 55 performs a weighted average of the sample potential function and the current potential function, and gradually changes the control input so as to gradually increase the weight of the sample potential function. Thus, the artificial force field calculation unit 55 gradually switches the control input from the artificial force field based on the current potential function to the artificial force field based on the sample potential function.

For example, when the current potential function is denoted by "A(x)" and the sample potential function is denoted by "B(x)", the artificial force field calculation unit 55 determines the potential function to be used for calculating the approximate artificial force field according to the following expression (16) or expression (17) using "$\lambda$" ($0 \leq \lambda \leq 1$).

$$(1-\lambda) \cdot A(x) + \lambda \cdot B(x) \tag{16}$$

$$A^{(1-\lambda)}(x) \cdot B^{\lambda}(x) \tag{17}$$

Here, $\lambda$ gradually changes from 0 to 1 in the time interval at which sampling by the sampling unit 54 is performed. Namely, $\lambda$ is adjusted so that the initial value is "0" and becomes "1" at the timing for the sampling unit 54 to sample the next sample potential function. In this way, the artificial force field calculation unit 55 gradually switches the control input from the artificial force field based on the current potential function to the artificial force field based on the sample potential function thereby to suitably suppress the abrupt change in the control input.

In the fourth example, the artificial force field calculation unit 55 computes the approximate artificial force field based on a predetermined number of the potential functions sampled by the sampling unit 54 in the past.

For example, a sequence (array) of the predetermined number of the potential functions sampled by the sampling unit 54 in the past is denoted by "$(A_1(x), A_2(x), \ldots, A_e(x))$" and the potential function newly sampled by the sampling unit 54 is denoted by "B(x)". In this case, the artificial force field calculation unit 55 discards the oldest potential function "$A_e(x)$" from the sequence of the potential functions and calculates an approximate artificial force field based on the sequence "$(B(x), A_1(x), \ldots, A_{e-1}(x))$" of the potential functions including the potential function B(x) obtained by the latest sampling. Namely, the artificial force field calculation unit 55 updates the sequence of the potential functions by the FIFO (First In First Out) method, and calculates the approximate artificial force field based on the updated sequence of the potential functions.

When calculating the approximate artificial force field based on the sequence of the potential functions, the artificial force field calculation unit 55 uses the product of each element of the sequence of the potential functions as one potential function (i.e., an objective function), and calculates the partial derivative of the one potential function as an approximate artificial force field. In this way, the artificial force field calculation unit 55 determines such a potential function that approaches 0 as any of the predetermined number of the latest potential functions sampled by the sampling unit 54 approaches 0, and calculates the partial derivative of the potential function as an approximate artificial force field that is used for the control input. Even in this case, the artificial force field calculation unit 55 can also suppress a sudden change in the control input.

Specific Example

Next, a specific example based on the functional block shown in FIG. 4 will be described below.

It is herein assumed that atomic task information indicative of an atomic task "the robot 6 with the index i captures a mobile object with the index j" is registered in atomic task DB 41. It is also assumed that the atomic potential function "$P_{i,j}(x)$" corresponding to the atomic proposition "$\varphi_{ij}$" corresponding to the atomic task described above is the square of the distance between the robot 6 with the index i and the mobile body with the index j. Namely, assuming that the coordinates of the robot 6 with the index i are denoted by "$x_i$" and the coordinates of the mobile object with the index j are denoted by "$x_j$", the atomic potential function "$P_{i,j}(x)$" is expressed by the following expression (18).

$$P_{ij}(x) = \|x_j - x_i\|^2 \tag{18}$$

Here, it is assumed that the information processing device 1 has received the input signal S1 indicative of the logical expression shown in the following expression (19).

$$\bigvee_{\sigma \in S} \bigwedge_i \varphi_{i\sigma_i} \tag{19}$$

"$\sigma$" indicates the permutation of robots 6 with the index 1 to the index n, and "S" indicates the set of the permutation $\sigma$ of the robots 6 with the index 1 to the index n. "$\sigma_i$" indicates the index of the mobile object captured by the robot 6 with the index i. In order to simplify the explanation, a task logical expression expressed in the disjunctive normal form is already given.

Here, a specific example of sampling by the sampling unit 54 using the Metropolis-Hastings method, which is one mode of MCMC, will be described.

First, the initial value of the permutation $\sigma$ is set as step 1. Next, as step 2, a new permutation candidate "$\sigma$" is selected according to the appropriate probability distribution. For example, the permutation in which the two orders in the current permutation $\sigma$ are interchanged is selected as the new permutation candidates $\sigma'$. When the current permutation $\sigma$ is "$\sigma=1, 2, 3, 4$" (the numerical value is the index of each robot 6), the permutation candidate $\sigma$ in which the order of the robot 6 with the index 1 and the order of the robot 6 with the index 4 are interchanged is "σ'=4, 2, 3, 1".

Next, as step 3, the potential function "$P_{\sigma'}(x)$" for the permutation candidate σ' and the potential function "$P_\sigma(x)$" for the current permutation σ each corresponding to the potential function $P_i(x)$ according to the expression (9) are calculated and then the magnitudes thereof are compared. Then, if the potential function $P_{\sigma'}(x)$ corresponding to the permutation candidate σ' is equal to or smaller than the potential function $P_\sigma(x)$ corresponding to the current permutation σ, the current permutation σ is replaced with the permutation candidate σ'. Namely, if the following expression (20) is satisfied, "σ=σ'" is set.

$$P_\sigma(x) = \sum_{i=1}^{n} P_{i\sigma_i}(x) \geq P_{\sigma'}(x) = \sum_{i=1}^{n} P_{i\sigma'_i}(x) \quad (20)$$

On the other hand, if the expression (20) is not satisfied, "σ=σ'" is set with the probability "$\{P_\sigma(x)/P_{\sigma'}(x)\}^{\alpha}$" (α is a constant).

For example, it is assumed that "σ=1, 2, 3, 4" and "σ'=4, 2, 3, 1" are set and the distance between the robots 6 and the mobile objects are set to "(1, 1)=2", "(2, 2)=1", "(3, 3)=1", "(4, 4)=2", "(1, 4)=3", "(4, 1)=2", wherein the distance between the robot 6 with the index i and the mobile object with the index j is referred to as "(i, j)". In this case, the potential function $P_\sigma(x)$ and the potential function $P_{\sigma'}(x)$ are set to "$P_\sigma(x)=10$", "$P_{\sigma'}(x)=15$", respectively. Since the expression (20) is not satisfied, the current permutation σ is replaced by the permutation candidate σ' with the probability (⅔)$^\alpha$. The larger α is, the smaller the provability to update the permutation when the expression (20) is not satisfied becomes Then, the sampling unit 54 repeats above-described step 2 and step 3 by a predetermined number of times and notifies the artificial force field calculation unit 55 of the potential function $P_\sigma(x)$ for the present permutation σ as a sample potential function after repeating the steps by the predetermined number of times.

Next, the artificial force field calculation unit 55 calculates the approximate artificial force field according to any one of the methods shown in the first to fourth examples described above, based on the sample potential function and the current potential function. For example, assuming that the two-dimensional coordinates of the mobile objects with the indexes 1 to 4 are "(0, 2)", "(1, −1)", "(−1, −1)", "(√5, 2)", respectively, and that the x-coordinate of the robot 6 with the index i is "$x_{i1}$" and the y-coordinate is "$x_{i2}$", the approximate artificial force field is expressed by the following expression (21).

$$\frac{\partial P_\sigma}{\partial x}(x) = \left(2x_{11}, 2x_{12} - 4, \right.$$
$$\left. 2x_{21} - 2, 2x_{22} + 2, 2x_{31} + 2, 2x_{32} + 2, 2x_{41} - 2\sqrt{5}, 2x_{42} - 4\right)^T \quad (21)$$

Then, when each robot 6 can freely determine the speed through the control input, the output unit 56 determines the control input vector corresponding to the following expression.

$$-\frac{\partial P_\sigma}{\partial x}(x)$$

Therefore, in this case, when the approximate artificial force field shown in the expression (21) is obtained, the output unit 56 transmits, to the robot 6 with the index 1, the control signal S3 instructing the robot 6 to move in the x-direction at the speed "−2 $x_{11}$" and in the y-direction at the speed "4−2 $x_{12}$". Similarly, the output unit 56 transmits, to the robot 6 with the index 2, the control signal S3 instructing the robot 6 to move at the speed "2−2 $x_{21}$" in the x-direction and at the speed "−2 $x_{22}$−2" in the y-direction. Further, the output unit 56 transmits, to the robot 6 with the index 3, the control signal S3 instructing the robot 6 to move at the speed "−2 $x_{31}$−2" in the x-direction and at the speed "−2 $x_{32}$−2" in the y-direction. Further, the output unit 56 transmits, to the robot 6 with the index 4, the control signal S3 instructing the robot 6 to move at the speed "2√5−2 $x_{41}$" in the x direction and at the speed "4−2 $x_{42}$" in the y direction.

Then, the information processing device 1 repeats the processing (that is, the processing from the sampling to the output of the control input) executed by the sampling unit 54, the artificial force field calculation unit 55, and the output unit 56 described above at regular intervals. In accordance with this repetition, due to the nature of MCMC, the control input approaches the control input based on the artificial force field (i.e., the artificial force field yielded from the synthesized potential function) according to the expression (14) on the expected value basis.

[Task Input View]

Figure 5:
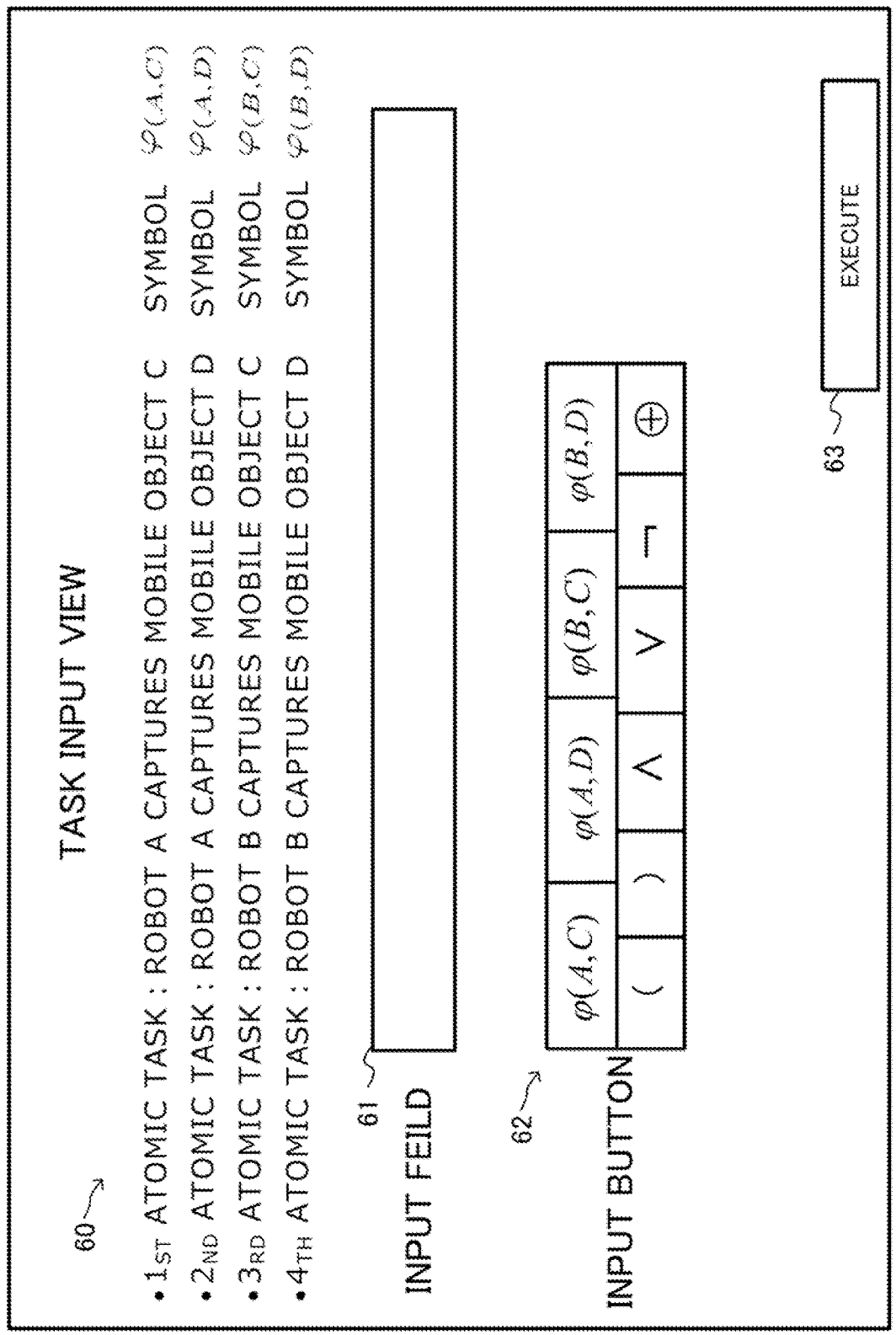
FIG. 5 illustrates a first display example of the task input view.

FIG. 5 is a first display example of a task input view displayed by the display device 3. In this case, for example, when the acquisition unit 51 acquires the input signal S1 indicating the display request of the task input view through the input device 2, the display control unit 50 of the information processing device 1 generates the display signal S2 for displaying the task input view shown in FIG. 5 and transmits the display signal S2 to the display device 3. Then, in the example of FIG. 5, the display control unit 50 provides an atomic task explanation area 60, a task logical input field 61, input buttons 62, and an execution button 63 on the task input view.

The atomic task explanation area 60 is an area that describes the atomic task to be performed by the robots 6. The display control unit 50 displays explanatory sentences relating to the contents of the four atomic tasks (the first atomic task to the fourth atomic task) in association with corresponding symbols (atomic propositions) on the basis of explanatory information and symbol information respectively included in four pieces of the atomic task information recorded in the atomic task DB 41. Thus, the viewer of the task input view can appropriately grasp the correspondence relationship between the contents of the first atomic task to the fourth atomic task and the corresponding symbols (atomic propositions) to be used for inputting the task logical expression.

The task logical expression input field 61 is an input field of the task logical expression, and the input buttons 62 are buttons for inputting atomic propositions, logical connectors, and other symbols in the task logical expression input field 61. The display control unit 50 provides, as the input buttons 62, buttons corresponding to "φ(A, C)", "φ(A, D)", "φ(B, C)", "φ(B, D)" each of which is a symbol (atomic proposition) corresponding to each of the first atomic task to the fourth atomic task, and buttons corresponding to logical connectors. Thereby, the viewer can suitably specify the task logical expression which instructs the complex task synthesized by the atomic tasks. Instead of selecting the button in the task logic input field 61, the viewer may input the task logical expression through any other operations such as a keyboard operation or a voice operation.

When detecting that the execution button 63 has been selected in the state in which the task logical expression has been inputted to the task logical expression input field 61, the acquisition unit 51 supplies the information on the task logical expression inputted to the task logical expression input field 61 to the disjunctive normal form conversion unit 53.

As described above, the information processing device 1 receives the input of atomic propositions, logical connectors, and other symbols on the task input view so that the user can appropriately specify the task logical expression indicating the objective task.

Figure 6:
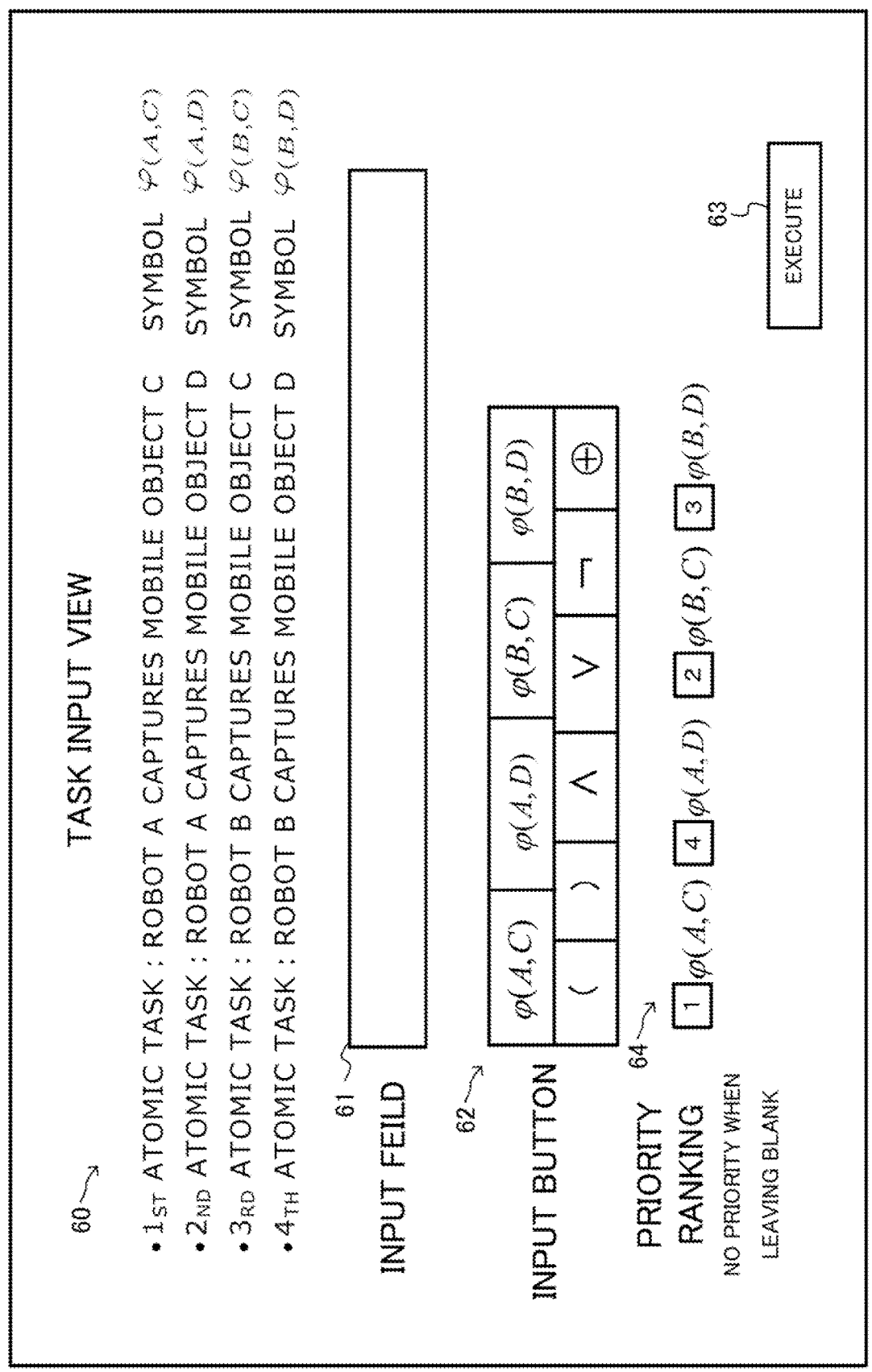
FIG. 6 illustrates a second display example of the task input view.

Further, the information processing device 1 may determine the priority to be set for each atomic task based on the user input. FIG. 6 is a second display example of a task input view.

As shown in FIG. 6, the display control unit 50 displays the priority ranking designation fields 64 for giving priority ranking to the atomic tasks on the task input view. Each of the priority ranking designation fields 64 is provided corresponding to each of the four atomic tasks (the first atomic task to the fourth atomic task), and receives the designation of the priority ranking for each atomic task. In the example of FIG. 6, the priority ranking of the first atomic task "φ(A, C)" is the highest ranking (first place), and the priority ranking of the second atomic task "φ(A, D)" is the lowest ranking (fourth place).

When the execution button 63 is selected in a condition in which the task logical expression input field 61 and the priority ranking designation fields 64 are inputted, the acquisition unit 51 supplies information on the task logical expression inputted to the task logical expression input field 61 and information on the priority ranking of each atomic task designated in the priority ranking designation fields 64 to the disjunctive normal form conversion unit 53. In this case, the disjunctive normal form conversion unit 53 determines the degree of the priority of each atomic task based on the information on the priority ranking of each atomic task. In this case, the disjunctive normal form conversion unit 53 determines the degree of the priority of each atomic task so that the higher the priority ranking is, the higher the degree of the priority becomes, based on a predetermined rule or by referring to a predetermined table or the like.

Thus, according to the task input view in FIG. 6, the priority ranking of the atomic tasks to be used can be suitably specified by the user. Instead of the priority ranking designation fields 64, the display control unit 50 may display an input filed for inputting the degree of the priority for each atomic task on the task input view and receive the specification of the degree of the priority of each atomic task.

[Processing Flow]

Figure 7:
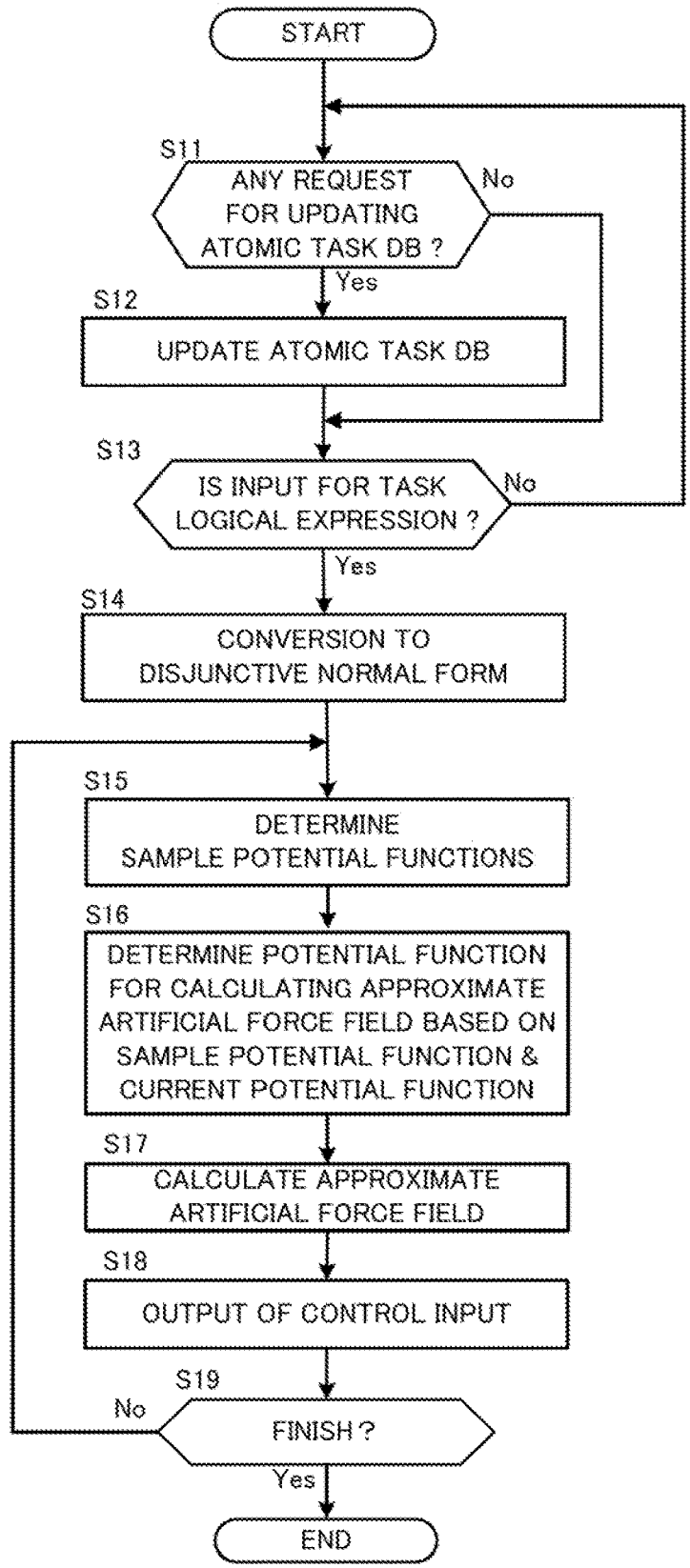
FIG. 7 illustrates an example of a flowchart which the information processing device executes in a first example embodiment.

FIG. 7 is an example of a flow chart in which the information processing device 1 executes in the first example embodiment. The information processing device 1 repeatedly executes the processing of the flowchart shown in FIG. 7.

First, the atomic task setting unit 52 of the information processing device 1 determines whether or not there is a request for updating the atomic task DB 41 (Step S11). In this case, for example, the atomic task setting unit 52 determines whether or not the acquisition unit 51 has received an input signal S1 indicating a user input relating to addition, change, or deletion of atomic task information to be recorded in the atomic task DB 41 from the input device 2. When there is a request for updating the atomic task DB 41 (Step S11; Yes), the atomic task setting unit 52 updates the atomic task DB 41 based on the input signal S1 supplied from the input device 2 (Step S12). In this case, the atomic task setting section 52 adds, changes, or deletes the atomic task information to be recorded in the atomic task DB 41. On the other hand, when there is no request for updating the atomic task DB 41 (Step S11; No), the information processing device 1 advances the processing to Step S13.

Further, the disjunctive normal form conversion unit 53 of the information processing device 1 determines whether or not there is an input of the task logical expression (Step S13). When there is no input of the task logical expression (Step S13; No), the information processing device 1 returns the process to Step S11. On the other hand, when there is an input of the task logical expression (Step S13; Yes), i.e., when the acquisition unit 51 receives the input signal S1 indicating the task logical expression from the input device 2, the disjunctive normal form conversion unit 53 converts the task logical expression to the disjunctive normal form (Step S14).

Next, the sampling unit 54 of the information processing device 1 determines a sample potential function based on a sampling technique such as a MCMC (Step S15). In this case, from the potential functions $P_i(x)$ (i=1, ..., L) shown in the expression (9), the sampling unit 54 selects a potential function with any of the indexes as the sample potential function according to the probability shown in the expression (15).

Next, the artificial force field calculation unit 55 determines a potential function for calculating an approximate artificial force field based on the sample potential function and the current potential function (Step S16). For example, the artificial force field calculation unit 55 determines a potential function for calculating the approximate artificial force field based on any of the first to fourth examples described in the section of [Calculation of Approximate Artificial Force Field].

Then, the artificial force field calculation unit 55 calculates an approximate artificial force field corresponding to the gradient of the determined potential function by calculating the partial differentiation of the above potential function (Step S17). Then, the output unit 56 outputs the control input based on the approximate artificial force field calculated by the artificial force field calculation unit 55 (Step S18). For example, if each of the robots 6 can freely determine the speed through the control input, the output unit 56 transmits the control signal S3 indicative of the control input that is the approximate artificial force field to each of the robots 6 via the communication device 5.

Then, the information processing device 1 determines whether or not to terminate the processing of the flowchart (step S19). For example, the information processing device 1 determines that the processing of the flowchart should be terminated when the objective task is achieved, or when a predetermined time has elapsed, or when a user input indicating that the execution of the task should be terminated is detected. Then, when it is determined that the processing of the flowchart should be terminated (step S19; Yes), the information processing device 1 ends the process of the flowchart. On the other hand, when it is determined that the processing of the flowchart should not be terminated (step S19; No), the information processing device 1 returns the process to step S15.

Thus, when a task logical expression is given in which an objective task is expressed by a combination of propositions of atomic tasks and logical connectors, the information processing device 1 computes an approximate artificial force field which approximates the artificial force field of an objective function corresponding to the task logical expression. Thereby, the information processing device 1 reduces the calculation amount for determining the control input of the robots 6, suitably ensuring the real-time for the control of the robots 6.

[Modification]

The following modifications may be applied to the example embodiments described above in arbitrary combination.

(First Modification)

Examples of robot models in which the artificial potential field method can be used are not limited to the robot model in which the derivation (i.e., velocity) of the position is used as the control input. Alternatively, for example, it may be a robot model in which the acceleration is used as the control input. The detail of the example of the above-mentioned robot model is described in Non-Patent Literature 1, for example.

(Second Modification)

Each of the robot 6 may have one or more functions which the information processing device 1 has instead.

For example, the information processing device 1 transmits a control signal S3 indicating a task logical expression to each robot 6, and each robot 6 calculates an approximate artificial force field based on the task logical expression specified by the control signal S3 and determines a control input from the approximate artificial force field. Then, on the basis of the determined control input, each robot 6 autonomously performs movement. In this case, each robot 6 is capable of storing or referring to the atomic task DB 41, and has functions corresponding to the acquisition unit 51, the disjunctive normal form conversion unit 53, the sampling unit 54, and the artificial force field calculation unit 55, which are shown in the functional block in FIG. 4. In this case, each robot 6 acquires the control signal S3 indicating the task logical expression from the information processing device 1. In addition, as with the disjunctive normal form conversion unit 53, each robot 6 converts the task logical expression indicated by the control signal S3 into the disjunctive normal form. As with the sampling unit 54, each robot 6 selects the sample potential function from a plurality of potential functions $P_i(x)$ (i=1, . . . , L) which are based on the task logical expression. Then, as with the artificial force field calculation unit 55, each robot 6 calculates the approximate artificial force field from the determined sample potential function.

Further, each robot 6 acquires position information regarding the own robot 6 and other robots 6 to be substituted into the potential function. In this case, each robot 6 includes, for example, one or more internal sensors and external sensors and acquires the position information regarding the own robot 6 and other robots 6 based on the output by these sensors. In another example, each robot 6 may acquire the position information by communicating with other robots 6. In yet another example, when an objective function is given corresponding to such an objective task that the robots 6 captures (trails) multiple objects, the information processing device 1 acquires not only the position information regarding each robot 6 but also position information regarding each of the objects in the same way.

According to this modification, each robot 6 can calculate the artificial force field approximately while suppressing the calculation amount even when the task logical expression corresponding to the complex objective task is specified, and suitably determine the control input to be applied to the own robot. Further, in this case, it is not essential for each robot 6 to communicate with other robots 6 because each robot 6 determines the control input autonomously based on the potential method. Therefore, each robot 6, even in a situation where the robots 6 cannot communicate with one another, each robot 6 can appropriately operate by acquiring the position information regarding the own and other robots 6 based on the output by the internal sensors and the external sensors.

(Third Modification)

The process performed by the atomic task setting unit 52 described in FIG. 4 may be performed by a device other than the information processing device 1. In this case, the above-described device can refer to and update the atomic task DB 41, and update the atomic task DB 41 based on the user input through the input device 2 or other input device.

(Fourth Modification)

Only one robot 6 may be the execution subject (i.e., the control target) of the objective task although a plurality of robots 6 are the execution subjects of the objective task in the configuration example of the robot control system 100 illustrated in FIG. 1. Even in this case, the information processing device 1 can receive the input of the task logical expression which expresses the complex objective task for one robot 6 by the combination of the atomic tasks, and appropriately output the corresponding objective function.

Second Example Embodiment

Figure 8:
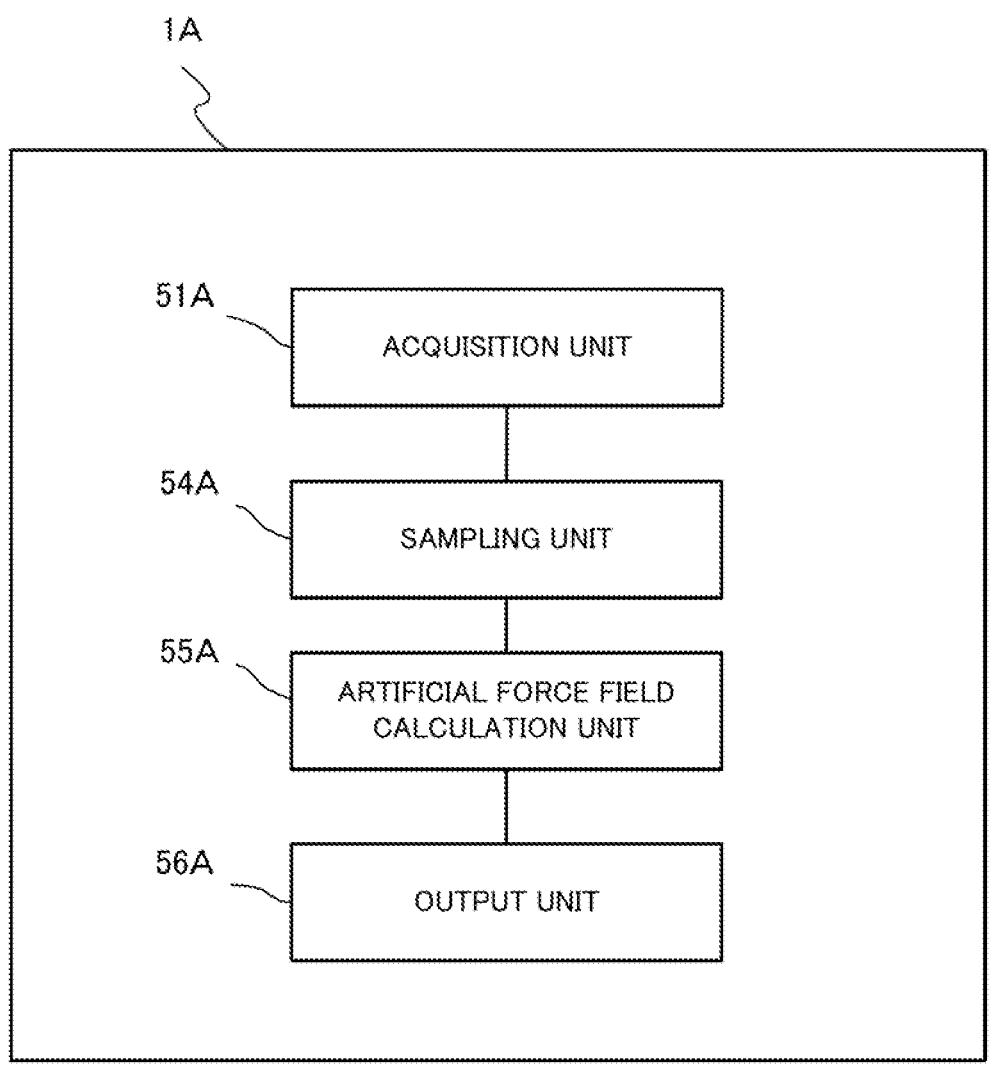
FIG. 8 illustrates a functional block diagram of the information processing device according to a second example embodiment.

FIG. 8 is a functional block diagram of the information processing device 1A according to the second example embodiment. As shown in FIG. 8, the information processing device 1A mainly includes an acquisition unit 51A, a sampling unit 54A, an artificial force field calculation unit 55A, and an output unit 56A.

The acquisition unit 51A is configured to acquire a task logical expression in which an objective task to be performed by a robot is expressed by a combination of a plurality of atomic tasks. The sampling unit 54A is configured to perform sampling of one potential function from among a plurality of potential functions each of which is synthesized atomic potential functions, the atomic potential functions each corresponding to each of the atomic tasks. The artificial force field calculation unit 55A is configured to calculate, on a basis of the sampled potential function, an approximate artificial force field which approximates an artificial force field yielded when the atomic potential functions are synthesized according to the task logical expression. The output unit 56A is configured to output the approximate artificial force field.

The information processing device 1A according to the second example embodiment approximately calculates the artificial force field yielded when the atomic potential function is synthesized according to the task logical expression, and suitably reduce the amount of calculation for determining the control input of the robot 6 and securing the real-time process for the control of the robot 6.

The whole or a part of the example embodiments described above (including modifications, the same applies hereinafter) can be described as, but not limited to, the following Supplementary Notes.

[Supplementary Note 1]

An information processing device comprising:
- an acquisition unit configured to acquire a task logical expression in which an objective task to be performed by a robot is expressed by a combination of a plurality of tasks;
- a sampling unit configured to perform sampling of one potential function from among a plurality of potential functions each of which is synthesized atomic potential functions, the atomic potential functions each corresponding to each of the tasks;
- an artificial force field calculation unit configured to calculate, on a basis of the one potential function, an approximate artificial force field which approximates an artificial force field yielded when the atomic potential functions are synthesized according to the task logical expression; and
- an output unit configured to output the approximate artificial force field.

[Supplementary Note 2]

The information processing device according to Supplementary Note 1,
- wherein the artificial force field calculation unit is configured to calculate the approximate artificial force field based on the one potential function and a potential function that was used for calculation of an approximate artificial force field that was outputted by the output unit.

[Supplementary Note 3]

The information processing device according to Supplementary Note 2,
- wherein, when the one potential function is smaller than the potential function that was used for the calculation of the last outputted approximate artificial force field, the output unit is configured to output the approximate artificial force field corresponding to a gradient of the one potential function, and
- wherein, when the one potential function is equal to or larger than the potential function that was used for the calculation of the last outputted approximate artificial force field, the output unit is configured to output the last outputted approximate artificial force field.

[Supplementary Note 4]

The information processing device according to Supplementary Note 2,
- wherein the output unit is configured to gradually change the approximate artificial force field to be outputted from the last outputted approximate artificial force field to the approximate artificial force field corresponding to a gradient of the one potential function.

[Supplementary Note 5]

The information processing device according to Supplementary Note 2,
- wherein the artificial force field calculation unit is configured to calculate the approximate artificial force field corresponding to a gradient of a product of a predetermined number of potential functions sampled in the past by the sampling unit and the one potential function.

[Supplementary Note 6]

The information processing device according to any of Supplementary Notes 1 to 5,
- wherein the sampling unit is configured to convert a logical conjunction included in the logical expression into an addition operator and convert a logical disjunction included in the logical expression into a multiplication operator.

[Supplementary Note 7]

The information processing device according to Supplementary Note 6,
- a disjunctive normal form conversion unit configured to convert the logical expression into a disjunctive normal form,
- wherein the sampling unit is configured to sample the one potential function from among the plurality of the potential functions determined based on the logical expression converted into the disjunctive normal form.

[Supplementary Note 8]

The information processing device according to any of Supplementary Notes 1 to 7,
- wherein the sampling unit is configured to determine the atomic potential functions to be synthesized by referring to task information stored in a storage unit, the task information associating each of the tasks with a corresponding atomic potential function.

[Supplementary Note 9]

The information processing device according to any of Supplementary Notes 1 to 8,
- wherein the objective task is a task to be performed by multiple robots jointly, and
- wherein each of the tasks is a task for any one robot of the multiple robots.

[Supplementary Note 10]

A control method executed by an information processing device, the control method comprising:
- acquiring a task logical expression in which an objective task to be performed by a robot is expressed by a combination of a plurality of tasks;
- performing sampling of one potential function from among a plurality of potential functions each of which is synthesized atomic potential functions, the atomic potential functions each corresponding to each of the tasks;
- calculating, on a basis of the one potential function, an approximate artificial force field which approximates an artificial force field yielded when the atomic potential functions are synthesized according to the task logical expression; and
- outputting the approximate artificial force field.

[Supplementary Note 11]

A storage medium storing a program executed by a computer, the program causing the computer to function as:
- an acquisition unit configured to acquire a task logical expression in which an objective task to be performed by a robot is expressed by a combination of a plurality of tasks;
- a sampling unit configured to perform sampling of one potential function from among a plurality of potential functions each of which is synthesized atomic potential functions, the atomic potential functions each corresponding to each of the tasks;
- an artificial force field calculation unit configured to calculate, on a basis of the one potential function, an approximate artificial force field which approximates an artificial force field yielded when the atomic potential functions are synthesized according to the task logical expression; and
- an output unit configured to output the approximate artificial force field.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A Information processing device
2 Input device
3 Display device
4 Storage device
5 Communication device
6, 6A, 6B robot
41 Atomic task DB
100 Robot control system

What is claimed is:

1. An information processing device comprising a memory storing a program and a processor configured to execute the program to:
acquire a task logical expression in which an objective task to be performed by a robot is expressed as a combination of a plurality of tasks;
perform sampling of one potential function from among a plurality of potential functions that are synthesizable atomic potential functions and that correspond to the tasks;
calculate, on a basis of the one potential function, an approximate artificial force field that approximates an artificial force field yielded when the synthesizable atomic potential functions are synthesized according to the task logical expression; and
output the approximate artificial force field, wherein
the processor is configured to calculate the approximate artificial force field based on the one potential function and a potential function that was used for calculation of a last outputted approximate artificial force field,
the processor is configured to, when the one potential function is smaller than the potential function that was used for the calculation of the last outputted approximate artificial force field, output the approximate artificial force field corresponding to a gradient of the one potential function, and
the processor is configured to, when the one potential function is equal to or larger than the potential function that was used for the calculation of the last outputted approximate artificial force field, output the last outputted approximate artificial force field.

2. The information processing device according to claim 1,
wherein the processor is configured to gradually change the approximate artificial force field to be outputted from the last outputted approximate artificial force field to the approximate artificial force field corresponding to the gradient of the one potential function.

3. The information processing device according to claim 1,
wherein the processor is configured to calculate the approximate artificial force field corresponding to a gradient of a product of a predetermined number of potential functions sampled in the past and the one potential function.

4. An information processing device comprising a memory storing a program and a processor configured to execute the program to:
acquire a task logical expression in which an objective task to be performed by a robot is expressed as a combination of a plurality of tasks;
convert a logical conjunction included in the task logical expression into an addition operator;
convert a logical disjunction included in the task logical expression into a multiplication operator;
perform sampling of one potential function from among a plurality of potential functions that are synthesizable atomic potential functions and that correspond to the tasks;
calculate, on a basis of the one potential function, an approximate artificial force field that approximates an artificial force field yielded when the synthesizable atomic potential functions are synthesized according to the task logical expression; and
output the approximate artificial force field.

5. The information processing device according to claim 4,
wherein the processor is further configured to convert the logical expression into a disjunctive normal form, and
wherein the processor is configured to sample the one potential function from among the plurality of the potential functions determined based on the logical expression converted into the disjunctive normal form.

6. The information processing device according to claim 4,
wherein the processor is configured to determine the synthesizable atomic potential functions by referring to task information stored in a storage memory, the task information associating each of the tasks with a corresponding synthesizable atomic potential function.

7. The information processing device according to claim 4,
wherein the objective task is a task to be performed by multiple robots jointly, and
wherein each of the tasks is a task for any one robot of the multiple robots.

8. A control method performed by an information processing device and comprising:
acquiring a task logical expression in which an objective task to be performed by a robot is expressed by a combination of a plurality of tasks;
converting a logical conjunction included in the task logical expression into an addition operator;
converting a logical disjunction included in the task logical expression into a multiplication operator;
performing sampling of one potential function from among a plurality of potential functions that are synthesizable atomic potential functions and that correspond to the tasks;
calculating, on a basis of the one potential function, an approximate artificial force field that approximates an artificial force field yielded when the synthesizable atomic potential functions are synthesized according to the task logical expression; and
outputting the approximate artificial force field.

* * * * *